United States Patent [19]

Kurek et al.

[11] Patent Number: 5,273,663
[45] Date of Patent: Dec. 28, 1993

[54] OXIDATIVE REMOVAL OF AQUEOUS CYANIDE UNDER ACIDIC CONDITIONS

[75] Inventors: Paul R. Kurek, Barrington; Robert R. Frame, Glenview; Tom N. Kalnes, La Grange; Mark D. Moser, Elk Grove Village, all of Ill.

[73] Assignee: UOP, Des Plaines, Ill.

[21] Appl. No.: 16,355

[22] Filed: Feb. 11, 1993

[51] Int. Cl.$^5$ .............................................. C02F 1/78
[52] U.S. Cl. ................................. 210/759; 210/760; 210/763; 210/904
[58] Field of Search .............. 210/748, 758, 759, 760, 210/763, 904

[56] References Cited

U.S. PATENT DOCUMENTS

| | | | |
|---|---|---|---|
| 4,537,686 | 8/1985 | Borbely et al. | 210/713 |
| 5,120,453 | 6/1992 | Frame et al. | 210/759 |
| 5,156,748 | 10/1992 | Meunier et al. | 210/759 |

OTHER PUBLICATIONS

R. Gierzatowicz et al., Effluent and Water Treatment Journal, 25, 26–31 (1986).
Chen et al. (Paper 81c presented at the 1990 AIChE Summer National Meeting, San Diego, California, Aug. 21, 1990).

*Primary Examiner*—Peter Hruskoci
*Attorney, Agent, or Firm*—Thomas K. McBride; Eugene I. Snyder

[57] ABSTRACT

The oxidation of cyanide under acid conditions using oxygen as the oxidizing agent can be effected under mild reaction conditions when certain metal chelates are used as catalysts. Especially effective chelates are metal phthalocyanines, particularly where the metal is vanadium or a member of the iron group metals. The oxidation can be effected homogeneously using water soluble metal chelates, or can be performed heterogeneously, especially in a continuous fashion using a packed bed reactor, by using suitable water-insoluble metal chelates, especially when supported on appropriate carriers.

32 Claims, No Drawings

OXIDATIVE REMOVAL OF AQUEOUS CYANIDE UNDER ACIDIC CONDITIONS

BACKGROUND OF THE INVENTION

It is only in relatively recent years that society has appreciated the impact and consequences of the fact that we live in a closed ecological system. With an increase in human population and, perhaps more importantly, an increase in industrial activity the effects of ecological changes have become more apparent. One area which has received a great deal of attention is that of water quality, which may be the result of the belated recognition that not only is water of a suitable quality for human consumption a limited resource, but that good water quality is an important, if not critical, factor in the ecological chain. Consequently attention has turned not only to purification of water in local water supplies, but also to limiting the discharge of materials into streams and aquifers generally.

The classes of noxious materials (pollutants) in aqueous discharges vary over an enormously broad spectrum. Among the inorganic pollutants those toxic to a broad spectrum of biological species are especially dangerous. Although heavy metals such as lead, cadmium, and arsenic often are the first culprits thought of, inorganic water soluble cyanide is in a comparably dangerous class because of the generally low tolerance of life forms to cyanide.

The sources of cyanide are many and varied and include iron and steel manufacturing, petroleum and coal pyrolysis processes, the photographic, chemicals, and pharmaceutical industries, precious metal mining and metal finishing, including electroplating and galvanizing. For example, cyanide arises in iron and steel manufacture by reduction of carbonate in the presence of carbon and nitrogen. In power plants coal burning may afford coke oven gas with a hydrogen cyanide concentration on the order of 2 grams per liter. Cyanide solutions are an important component of electroplating and galvanizing, and wash water streams resulting from post-coating treatment often contain significant quantities of cyanide. The widespread prevalence of cyanide in industrial effluents coupled with their near universal toxicity to life has made it imperative to minimize cyanide concentration in aqueous streams.

It appears that the most prevalent methods of cyanide removal are based on the oxidation of cyanide. See generally R. Gierzatowicz et al. *Effluent and Water Treatment Journal*, 25, 26–31 (1986). Oxidation with chlorine or hypochlorite seems to be industrially the most commonly employed method. The first stage in this oxidation is the formation of cyanogen chloride, ClCN, itself a rather toxic gas, but which is hydrolyzed at a high pH to the less toxic cyanate, CNO. Cyanate is itself hydrolyzed to carbon dioxide and ammonia at low pH, or is further oxidized to carbon dioxide and nitrogen. Another oxidative method uses peroxides such as hydrogen peroxide, Caro's acid, peracetic acid, and so on, as the oxidizing agent. The advantages of this approach vis a vis the chlorine or hypochlorite based process is the lack of toxic byproducts and the formation of environmentally neutral species from the peroxides. A disadvantage is the long reaction times necessary for adequate oxidation. However, cupric ions supposedly act as catalysts for peroxide oxidation. Other oxidizing agents based on Mn(VII) and Cr(VI) also have been used.

More recently there has been described the oxidation of both free and complex cyanide in aqueous streams by a mixture of sulfur dioxide or alkali/alkaline earth metal sulfites (including bisulfites and metabisulfites) and air or water in the presence of a water-soluble copper(II) catalyst at a pH between 5 and 12; U.S. Pat. No. 4,537,686. [Although copper is designated as "Cu+" in the issued patent, the fact that most cuprous salts are water insoluble and that Cu(I) is readily oxidized strongly suggests that Cu(II) actually was used.] Using rather high weight ratios of copper to cyanide on the order of about 0.25, final cyanide concentrations could be reduced to under 0.1 parts per million. More recently Chen et al. (Paper 81c presented at the 1990 AIChE Summer National Meeting, San Diego, Calif., Aug. 21, 1990) presented data on the oxidation with air of aqueous streams containing cyanide at 100 ppm using a soluble copper catalyst in conjunction with sodium sulfite at an optimum pH of 8 over activated carbon in a trickle bed reactor at normal pressure. Initially the copper/cyanide molar ratio was about 0.25, but since copper(II) hydroxide precipitated on the carbon surface, it was found that a copper/cyanide maintenance ratio of about 0.1 was quite adequate. Although the authors characterize the activated carbon as a catalyst, this conclusion is far from clear according to the data. Thus, although the authors showed that use of a bed of activated carbon leads to 99% removal of cyanide, beds of both a molecular sieve and glass beads were almost as effective in affording about 80% removal. The improved result with activated carbon could readily be attributed to adsorption (rather than oxidation) on the bed of activated carbon—activated carbon is known to be an excellent adsorbent—or to the differing extent of copper(II) deposition on the packed beds and its dispersion on the bed materials, or to some combination of the two.

A continuous method for the removal of cyanide using air or oxygen as the oxidizing agent at ambient temperatures and pressures is highly desirable. Although the foregoing references provide a start, much remains before a commercially viable system is operative. In particular, it is often desirable that the catalyst either be heterogeneous, or if homogeneous readily separable, in order to avoid contamination of the effluent by the catalyst itself as well as to minimize process cost associated with catalyst consumption. It also is desirable that the catalyst be relatively insensitive to as large a class of contaminants likely to accompany cyanide as is possible. The process should be capable of efficient operation at atmospheric pressure and preferably as close to ambient temperature as possible in order to minimize energy requirements. Finally, it is desirable for such a process to oxidize the cyanide over a rather wide range of initial cyanide concentrations, and to have the capability of oxidizing 90% or more of the cyanide present.

U.S. Pat. No. 5,120,453 provides a process for the oxidation of cyanide in aqueous streams where the cyanide is present as the anion, $CN^-$, and where the oxidation is performed under basic conditions. It may be noted that the cited prior art also emphasizes cyanide oxidation under basic conditions, and it also may be noted in passing that basic conditions either are a prerequisite to, or materially enhance the concentration of cyanide ion, so that the correlation between prior art oxidation under basic conditions and the presence of cyanide ion may be a fundamental one rather than being fortuitous. The patentees of the last cited patent use as catalysts a broad class of metal chelates which can be used either in a soluble or water-insoluble form to afford the opportunity of either a homogeneous or heterogeneous process. The oxidation products were largely carbon dioxide and nitrogen along with varying amounts of cyanate.

What we have now found, quite unexpectedly, is that the same class of catalysts as described in U.S. Pat. No. 5,120,453 also is effective in oxidizing inorganic cyanides under acidic conditions. This is surprising not only in view of the prior art which appears to place heavy emphasis on oxidation of cyanide under basic conditions, but also because the catalysts themselves were previously known as oxidation catalysts for mercaptans only under basic conditions. Thus, both relevant prior art relating to cyanide oxidation and relevant prior art relating to the catalysts themselves suggested that basic conditions were necessary for oxidation.

Oxidation of inorganic cyanides under acidic conditions affords an ancillary advantage of placing the oxidation of complexed inorganic cyanides within the realm of feasibility. It is well known that the cyanide ion complexes strongly with many metals to form stable complexes, e.g., ferrocyanides, whose dissociation constant is so small that the attending low (even miniscule) concentration of free cyanide ion is insufficient for any practical oxidation. Thus, these complex metal cyanides may for all practical purposes be oxidation resistant. However, these complexes are dissociated in acidic media (to form HCN). In the invention we describe which utilizes oxidation under acidic conditions it then follows that these strong complexes can be effectively and conveniently oxidized, in contrast to the prior art. Thus our invention now opens the possibility of the direct oxidation of many cyanide complexes such as result from mining and electroplating operations. This will be elaborated on more fully within.

Yet another incidental but significant benefit from oxidation of cyanide under acidic conditions is that the products are $CO_2$, $N_2$, and ammonium ion, $NH_4^+$. Under basic conditions the products are $CO_2$, $N_2$, and cyanate, $NCO^-$. Although the cyanate anion formed under basic conditions is relatively benign, nonetheless the ammonium ion formed under acidic conditions is environmentally far more preferable. Thus the overall result is that the oxidation products formed under acidic conditions are environmentally more benign than those products formed under basic conditions. Consequently acid oxidation of cyanides—especially where the cyanide-containing stream initially is acidic—is environmentally superior to basic oxidation of cyanides.

SUMMARY OF THE INVENTION

The purpose of this invention is to reduce the inorganic cyanide concentration in aqueous streams using as mild an oxidant as possible, and preferably oxygen, in an economical process capable of treating a multitude of streams where the oxidation is performed under acidic conditions. An embodiment comprises oxidizing the cyanide by contacting the cyanide-laden stream with an oxidizing agent in the presence of a catalyst which is a metal chelate at a pH under 7. In a specific embodiment the chelate is a phthalocyanine of cobalt, vanadium, nickel, or iron. In a more specific embodiment the catalyst is a chelate of a sulfonated cobalt phthalocyanine dispersed on carbon and the oxidizing agent is oxygen.

In yet another embodiment the catalyst is a water-soluble polysulfonated cobalt phthalocyanine. In a different embodiment the aqueous stream contains HCN as the principal inorganic cyanide and is at a pH between about 1 to about 6.

Other embodiments will be apparent from the ensuing description.

DESCRIPTION OF THE INVENTION

The need to remove cyanide from various waste water streams has been elaborated upon above. Although various methods currently are available, there remains a need for a process which is at once sufficiently flexible to be applicable to varying concentrations of cyanide, to be capable of being adaptable to both continuous and batch processes, to be catalytic in nature, and to be capable of using oxygen as the oxidizing agent. Of overriding importance is the need for a process which is operable under acidic conditions, where the inorganic cyanides are present principally as HCN. We have found that a class of metal chelates previously used in the oxidation of sulfides, especially mercaptans under basic conditions, are also effective in the oxidation of inorganic cyanides under acidic conditions. This observation was rather unexpected, in view of the experience that sulfide oxidation by the aforesaid metal chelates required base, the prior art teachings of cyanide oxidation (by other catalysts) under basic conditions, and the concern that the aforesaid metal chelates would leach under acidic conditions. Accordingly, it was not expected that these metal chelates would oxidize cyanides effectively under the acidic conditions described within.

It needs to be explicitly understood and recognized that the permissible cyanide level remaining after treatment of the water stream is variable. For example, the proposed standards for drinking water sets a level of 0.2 ppm as the maximum permissible. If an electroplater of common metals discharges to a publicly owned treatment waterwork less than 38,000 liters per day, the 4-day average of cyanide amenable to treatment is not more than 2.7 ppm. For the same type facility discharging 38,000 liters or more per day, the 4-day average can not exceed 1.0 ppm of total cyanide. From the foregoing it should be clear that a variety of final cyanide levels will be found acceptable; no single standard may be stated.

Any aqueous stream containing inorganic cyanide is suitable for use in this invention, which is to say that the nature of the water-soluble cyanide is largely immaterial, a condition which is in stark contrast to that for oxidation under basic conditions where the cyanide ion, $CN^-$, appears to be a necessary prerequisite for oxidation. Under acidic conditions the principal inorganic cyanide present is HCN. Hydrogen cyanide waste streams may result from HCN production and from acidification of streams containing cyanide salts of various types, e.g., sodium cyanide, potassium cyanide, and the alkali or alkaline earth metal cyanides generally. Hydrogen cyanide also may result from acidification of aqueous streams of tightly complexed metal cyanides, and this variant is particularly significant.

It is well known that cyanide complexes with many metals in several oxidation states to form a dazzling number and variety of metal cyanide complexes. Such metal complexes may be found in various compilations well known to and readily available to the practitioner, and therefore need not be elaborated upon here. Exemplary of such complexes are the well known iron complexes, such as hexacyanoferrate (II) and (III), gold complexes such as dicyanoaurate (I) and tetracyanoaurate (III), silver complexes as dicyanoargentate (I), chromium complexes such as dicyanochromate (III), nickel complexes such as hexacyanonickelate (II), copper complexes as tricyanocuprate (I) and tetracyanocuprate (II). It must be recognized that the foregoing are merely exemplary and representative, and many more complexes have been documented for cadmium, mercury, zinc, platinum, cobalt, molybdenum, manganese, vanadium and titanium, to mention but a few metals.

The advantages presented by the capability of our invention to oxidize inorganic cyanide under acidic conditions may be seen more clearly when comparing the present practice of cyanide removal from streams containing strongly complexed cyanide with the procedure our invention makes possible. Previously, aqueous streams containing complexed cyanides were treated with strong bases to precipitate a cyanide-containing sludge, the sludge was collected and then transported to a central site. To remove cyanide, the sludge was acidified and the generated HCN was trapped in a basic solution, and the basic cyanide then oxidized. In contrast, in the practice of our invention the aqueous stream containing complexed cyanide need only be acidified and the acidified stream oxidized directly, especially where the acidified stream does not contain particulates or sludge.

Our invention is applicable most desirably to streams containing up to about 500 parts per million cyanide, although it is preferably applicable to streams containing no more than about 100 ppm cyanide. Many streams contain cyanide on the order of 5 ppm, and for these streams our invention is especially effective. However, it needs to be clearly understood that our invention may be applicable to streams containing as much as several percent cyanide, although such streams may be an uncommon occurrence. Cyanide-laden aqueous streams include waste streams from metal plating industries, from photography laboratories, steel mills, chemicals waste streams such as arise in HCN and, e.g., acrylonitrile manufacture, and streams from the mining industry. However, the nature of the cyanide-containing streams which can be treated by the process of our invention is not particularly critical in any way since after acidification the principal cyanide remaining is hydrogen cyanide. Yet it also must be recognized that there is considerable diversity among the streams of their source. For example, waste streams from mining generally will contain predominantly complexed metal cyanides, whereas waste streams from a chemical plant practicing hydrocyanation probably will have only alkali metal cyanides originally.

The key to our invention is our discovery that certain metal chelates are effective in catalyzing the oxidation of inorganic cyanides under acidic conditions by such oxidizing agents as air itself. The metal chelates which act as catalysts are known to the art as effective in catalyzing the oxidation of mercaptans contained in a sour petroleum distillate to disulfides. The metal chelates include the metal compounds of tetrapyridinoporphyrazine described in U.S. Pat. No. 3,980,582, e.g., cobalt tetrapyridinoporphyrazine; porphyrin and metalloporphyrin catalysts as described in U.S. Pat. No. 2,966,453, e.g., vanadium tetraphenylporphin carboxylate; corrinoid catalysts as described in U.S. Pat. No. 3,252,892, e.g., manganese corrin sulfonate; chelate organometallic catalysts such as described in U.S. Pat. No. 2,918,426, e.g., the condensation product of an aminophenol and a metal of Group VIII; and the metal phthalocyanines as described in U.S. Pat. No. 4,290,913, etc. As stated in U.S. Pat. No. 4,290,913, metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine, and the like. The iron-group (Group VIII metals) phthalocyanines and vanadium phthalocyanines are particularly preferred, and among the iron-group phthalocyanines cobalt phthalocyanine is especially preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The degree of derivatization importantly affects the solubility of the metal chelates, such as the phthalocyanines, of this invention. Using the phthalocyanines as a specific example, monosulfonation affords a chelate which still is water insoluble (under 0.1 weight percent) and which quite suitably can be dispersed on a catalyst support or carrier for use in heterogeneous catalysis of cyanide in aqueous streams. On the other hand, polysulfonation up to 3-4 sulfonic acid residues per phthalocyanine affords a metal chelate which is water soluble and which is readily adaptable for use as a homogeneous catalyst under aqueous reaction conditions. The soluble metal chelates could be used, for example, in toxic waste storage ponds or in other storage facilities, especially in conjunction with aeration.

For use in a packed bed, heterogeneous catalytic operation the metal phthalocyanine catalyst can be absorbed or impregnated on a solid adsorbent support in any conventional or otherwise convenient manner. In general, the support or carrier material in the form of spheres, pills, pellets, granules or other particles of uniform or irregular shape and size is dipped, soaked, suspended or otherwise immersed in an aqueous or alcoholic solution and/or dispersion of the metal phthalocyanine catalyst, where the aqueous or alcoholic solution and/or dispersion may be sprayed onto, poured over, or otherwise contacted with the adsorbent support. In any case, the aqueous solution and/or dispersion is separated, and the resulting composite is allowed to dry under ambient temperature conditions, or dried at an elevated temperature in an oven or in a flow of hot gases, or in any other suitable manner. In general, up to about 25 weight percent metal phthalocyanine can be adsorbed on the solid adsorbent support or carrier material and still form a stable catalytic composite. A lesser amount in the range from about 0.1 to about 10 weight percent generally forms a suitably active catalytic composite, although the activity advantage derived from metal phthalocyanine concentrations in excess of about 2-5 weight percent generally does not warrant the use of higher concentrations.

The adsorbent support which may be used in the practice of this invention can be any of the well known adsorbent materials generally utilized as a catalyst support or carrier material. Preferred adsorbent materials include graphite and the various charcoals produced by the destructive distillation of wood, peat, lignite, nutshells, bones, and other carbonaceous matter, and preferably such charcoals as have been heat-treated or chemically treated or both, to form a highly porous particle structure of increased adsorbent capacity, and generally defined as activated carbon or charcoal. Said adsorbent materials also include the naturally occurring or synthetic zeolitic and molecular sieve materials generally and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. With regard to its intended use in aqueous systems, perhaps the most important property of the adsorbent support is its insolubility as well as complete unreactivity in aqueous systems. Charcoal, and particularly activated charcoal, is preferred because of its capacity for metal chelates, and because of its stability under treating conditions.

The major and fundamental distinction between this invention and the teachings of the prior art is that our process oxidizes cyanide under acidic conditions. By "acidic" is meant a pH under 7. Our invention may be practiced at a pH as low as about 0.5 and as high as about 6.5, but usually will be practiced in a pH range between about 1 and about 6, more often in the range of 2-5.5, and most often in the range between about 3 and about 5. Frequently the cyanide-containing aqueous streams will initially be acidic and can be oxidized directly without pH adjustment. In other cases, especially those where the cyanide is as a tightly bound complex, the aqueous stream must be acidified prior to oxidative treatment. In such cases the acid used for acidification does not have any substantial effect on the invention, and any suitable acid may be chosen. The mineral acids, especially sulfuric and hydrochloric acids, are the most common acids employed.

Although the invention as described may be practiced at a quite low pH, disadvantages accrue from materials corrosion and metal chelate leaching from the support and even chemical degradation of some supports. Hence there are benefits from performing the reaction in a buffered solution which tends to maintain the system at a moderate pH, e.g., above about pH 3. The nature of the buffer is quite immaterial so long as it is itself not oxidized under reaction conditions and does not chemically interfere with cyanide oxidation. Suitable buffers may be based on, e.g., phosphates, acetates, carboxylates generally, borates, carbonates, and so forth. It may be well to mention that since both $CO_2$ and $NH_4^+$ are reaction products there will be substantial internal buffering occurring as the reaction proceeds. This is yet another benefit flowing from our invention.

An ancillary benefit of oxidizing cyanide under acidic conditions is that the products are virtually exclusively carbon dioxide and ammonium ion. This contrasts with oxidation under basic conditions which affords carbon dioxide, nitrogen, and cyanate. The advantage of forming ammonium ion instead of cyanate ion has been commented on above.

Although the process which is our invention can be designed to operate satisfactorily under ambient conditions of temperature and pressure, this is not to say that these are the only conditions under which the process can be suitably practiced, or even that these are preferable reaction conditions for the oxidation of cyanide by oxygen in the presence of the metal chelates of this invention. In fact, one of the strengths of our invention is that it can be utilized under a very wide range of conditions. Thus, as to reaction temperature, temperatures may be as low as about 20° C. and as high as about 150° C. If the reaction is conducted at 1 atmosphere pressure, one is limited to an upper temperature of about 95° C. for aqueous systems because of the increased vapor pressure arising from water. On the other hand, if one is willing to operate at a higher pressure, or if other considerations make it desirable to operate at a higher pressure, then temperatures in excess of 95° C. may be used. It is certainly true that the higher the reaction temperature the faster the cyanide oxidation will proceed. Similarly, the higher the partial pressure of oxygen—assuming its use as the sole oxidant—the faster will the reaction proceed. Consequently there are some advantages to working at partial pressures of oxygen higher than 1 atm. and at as high a temperature as possible under the reaction pressures employed. As a practical matter, it is believed that temperatures in excess of about 150° C. and pressures in excess of about 20 atmospheres will prove only marginally beneficial and that no real economic benefit will accrue from practicing the invention herein under more stringent conditions.

It is also possible to practice our invention using either a flowing oxygen-containing gas stream or by presaturating the feedstream with oxygen and then oxidizing the saturated feedstream. In the first variant the reactants are in a two-phase system, and in the second variant the reactants are in a single-phase system. The variant where there is a flowing oxygen-containing gas stream presents the advantage that oxygen always can be present in great excess, although not in solution with the cyanide. Accordingly, some phase transport problems may arise. In the variant where all the oxygen is present in the feed stream oxygen transport is easier but the extent of cyanide oxidation, the rate of cyanide oxidation, or both, may be limited by the concentration of dissolved oxygen. Which variant is chosen is largely a matter of design choice.

As previously mentioned, the preferred oxidizing agent is oxygen, whether from air or from an oxygen-enriched gas. Other oxidants also may be used, in particular hydrogen peroxide and ozone, but these are not seen to be as generally convenient as that of oxygen. Where the cyanide content of the aqueous stream is no more than about 15 ppm, one can readily use air at atmospheric pressure as the source of oxygen, for under these conditions the level of dissolved oxygen will be sufficient for the concentration of cyanide present. On the other hand, one can go to higher pressures to effect higher concentrations of dissolved oxygen. However, we have found it more effective to continually bubble oxygen through the cyanide-laden aqueous stream in the reaction zone in order to provide sufficient oxygen for oxidation of cyanide at levels considerably higher than 15 ppm. Adequate dispersal of oxygen in the aqueous feedstock in contact with the metal chelate as catalyst is of considerable importance, but since appropriate methods of dispersal are well known in the art these will not be further discussed. Where a peroxide, such as hydrogen peroxide, is used as the oxidizing agent it can be conveniently added to the feedstock in an amount adequate to completely oxidize the cyanide present.

Although it is believed that temperature, oxidant concentration, and pH are the most important variables in the practice of our invention, other factors such as residence time, cyanide concentration, nature of the cyanide (free or complexed) constitute other process variables which the skilled worker will readily adapt to. As the data within show, the process variables can be changed over a rather broad range to affect the amount of cyanide oxidized. No inviolate rules can be stated for the degree of cyanide which should be removed; our previous comments showed no standard was applicable to all feedstocks and discharges. One desirable characteristic of our process is that removal of 90% of the cyanide is routine, removal of 95% is not difficult, and removal of greater than 98% is well within process capabilities.

The process of my invention can be practiced in a multiplicity of modes. Although practicing the invention using a water-insoluble metal chelate is anticipated to be the most widespread mode used, one can envision circumstances where a water-soluble catalyst is preferred. For example, the aqueous stream may come from the mining industry and contain a considerable amount of solids. Removal of the solids prior to oxidation of cyanide would lead to a solid mass containing substantial amounts of cyanide which itself might present serious disposal problems. In such a case it may be advantageous to use a water-soluble metal chelate to catalyze the oxidation of cyanide. It also should be clear that propitious choice of the metal in the metal chelate needs to be made in order to minimize contamination by the metal of the metal chelate when the aqueous stream is later disposed of.

As previously alluded to, in the vast majority of cases it is expected that a water-insoluble metal chelate will be used in order to effect a heterogeneous catalysis of cyanide oxidation. In such a mode it is advantageous to impregnate the metal chelate on a water-insoluble carrier, as described above, in order to effect as high a dispersal of the metal chelate as possible. One mode of oxidation would employ, or be analogous to, a slurry reactor, where the water-insoluble metal chelate, preferably dispersed on a water-insoluble carrier, is suspended in the aqueous feedstock and reaction is carried out using this well mixed suspension. Slurry reactions can be carried out either batchwise or continuously. In the continuous mode solids are removed from the feedstock after oxidation of cyanide and mixed with and resuspended in fresh feedstock passing into a slurry reactor.

However, it is contemplated that the process of our invention will be most useful when practiced in a continuous mode using a packed bed of the metal chelate dispersed on a suitable support. The cyanide-laden acidic feedstock can be passed either upflow or downflow, and the oxygen passed either concurrently or countercurrently. In yet another variation, suitable where the cyanide concentration is less than about 15 ppm, the feedstock can be saturated with oxygen prior to being contacted with the metal chelate in the reaction zone. As discussed previously, the level of oxygen dissolved in water is sufficient to oxidize up to about 15 parts per million cyanide, which accounts for the operability of the last described embodiment.

Even through the continuous oxidation of cyanide using a packed bed of a metal chelate dispersed on a suitable support may be practiced in any of the aforementioned modes, it has been found that a cocurrent oxygen feed may lead to oxygen-starved media and thereby may limit the amount of cyanide which can be oxidized under a given set of experimental conditions. Where this occurs one may operate a packed bed reactor in a trickle bed mode with countercurrent oxygen flow, that is, the aqueous feedstock flows downward over the packed catalyst bed and the oxygen is passed upward through the packed catalyst bed. It is anticipated that in this mode it is feasible to satisfactorily oxidize cyanide at concentrations at least as high as about 500 ppm when working at a pressure of air (as the sole oxygen source) of 1 atmosphere and a reaction temperature no more than about 95° C. It is expected that substantially higher cyanide concentrations can be used at higher partial pressures of oxygen and higher reaction temperatures. Especially where higher partial pressures of oxygen (i.e., over about 0.2 atmospheres) are used, or where oxygen addition is staged, cocurrent oxygen flow may provide adequate oxygen and may be preferred for economic reasons.

Other embodiments and variants will be apparent to the skilled worker, all of which are intended to be encompassed within and subsumed by our invention as claimed. The following examples merely illustrate several aspects of this invention. The examples are not intended to be exhaustive nor to restrict our invention in any way, and in particular our invention is not to be thought of as being limited to the examples themselves.

EXAMPLES

General Procedure. A feedstock was prepared from a solution of potassium cyanide dissolved in water and pH adjusted with sulfuric acid as needed. Feedstock was pumped downflow through a tube containing 90 grams (300 cc) of cobalt phthalocyanine dispersed on a carbon support in an amount sufficient to afford 259 ppm cobalt. The reactor was heated and maintained at the desired temperature and the weight hourly space velocity (WHSV) was varied to determine the extent of cyanide conversion and selectivity of cyanate formation as a function of temperature and WHSV.

EXAMPLE 1

The feedstock contained 55 ppm cyanide and was passed downflow cocurrently with an air flow maintained at 30 cc per minute. Representative data are given in Table 1. As the data clearly show, oxidation of cyanide is virtually quantitative even at 50° C. under appropriate flow velocities and affords very low levels of cyanate as an oxidation product. Virtually all of the oxidation product is carbon dioxide and ammonium ion.

TABLE 1

Oxidation of Cyanide; Cocurrent Air Flow

| TIME (hrs) | WHSV (gm/hr) | pH | TEMP (deg. C.) | % CYANIDE OXIDIZED | SELECTIVITY CYANATE, % | PRODUCT pH |
|---|---|---|---|---|---|---|
| 6 | 0.5 | 3.1 | 22.0 | 100.0 | 0.0 | |
| 18 | 0.5 | 3.1 | 22.0 | 100.0 | 0.0 | 8.0 |
| 30 | 0.5 | 3.1 | 22.0 | 100.0 | 0.0 | |
| 42 | 0.5 | 3.1 | 22.0 | 100.0 | 0.0 | 8.0 |
| 54 | 0.5 | 4.4 | 23.0 | 100.0 | 0.0 | |
| 66 | 0.5 | 4.4 | 22.0 | 100.0 | 0.0 | |
| 78 | 0.5 | 4.4 | 50.0 | 100.0 | 0.0 | 6.7 |
| 96 | 0.5 | 4.4 | 50.0 | 100.0 | 0.0 | |
| 108 | 0.5 | 4.4 | 50.0 | 100.0 | 0.0 | 6.7 |
| 120 | 1.0 | 4.4 | 50.0 | 100.0 | 0.0 | |
| 132 | 1.0 | 4.4 | 50.0 | 100.0 | 0.0 | 7.5 |
| 144 | 1.0 | 4.3 | 50.0 | 100.0 | 0.0 | |
| 156 | 1.0 | 4.3 | 50.0 | 100.0 | 0.0 | 5.2 |
| 168 | 1.0 | 4.3 | 50.0 | 100.0 | 0.0 | |
| 180 | 2.0 | 3.4 | 50.0 | 100.0 | 0.0 | |
| 192 | 2.0 | 3.4 | 50.0 | 94.5 | 1.2 | 4.6 |
| 204 | 2.0 | 3.1 | 50.0 | 82.3 | 1.3 | |
| 216 | 2.0 | 3.1 | 50.0 | 88.2 | 1.4 | 7.1 |
| 228 | 2.0 | 3.9 | 50.0 | 87.3 | 1.3 | |
| 240 | 2.0 | 3.9 | 50.0 | 76.4 | 1.5 | 7.0 |
| 252 | 2.0 | 4.2 | 50.0 | 45.5 | 2.5 | |
| 264 | 2.0 | 4.2 | 50.0 | 29.1 | 3.9 | |
| 276 | 1.0 | 4.2 | 33.0 | 38.2 | 2.9 | |
| 288 | 1.0 | 4.2 | 25.0 | 32.7 | 3.4 | |
| 300 | 1.0 | 3.5 | 22.0 | 27.3 | 4.1 | |
| 312 | 1.0 | 3.5 | 22.0 | 27.3 | 4.1 | |
| 324 | 1.0 | 3.5 | 22.0 | 27.3 | 4.1 | |
| 336 | 1.0 | 3.5 | 22.0 | 26.5 | 4.2 | |
| 348 | 1.0 | 3.5 | 22.0 | 69.0 | 1.6 | |
| 360 | 1.0 | 3.5 | 22.0 | 78.2 | 4.2 | |
| 372 | 0.5 | 3.5 | 22.0 | 83.6 | 2.6 | |
| 384 | 0.5 | 3.6 | 21.0 | 90.9 | 3.8 | |
| 396 | 0.5 | 3.6 | 21.0 | 92.7 | 4.4 | |
| 408 | 0.5 | 3.6 | 21.0 | 94.5 | 3.5 | |
| 420 | 2.0 | 3.6 | 21.0 | 69.1 | 2.9 | |
| 432 | 2.0 | 3.6 | 21.0 | 58.2 | 2.9 | |
| 462 | 2.0 | 3.5 | 50.0 | 80.0 | 1.4 | |
| 474 | 2.0 | 3.5 | 49.6 | 47.3 | 7.4 | |
| 486 | 1.0 | 3.5 | 50.0 | 85.5 | 2.8 | |
| 498 | 0.5 | 3.5 | 50.0 | 98.2 | 1.1 | |
| 510 | 0.5 | 2.6 | 50.0 | 98.2 | 1.1 | 7.0 |
| 522 | 0.5 | 2.6 | 50.0 | 98.2 | 1.1 | |
| 534 | 1.0 | 2.6 | 50.0 | 98.2 | 1.1 | |
| 546 | 1.0 | 2.6 | 50.0 | 78.2 | 3.2 | |
| 558 | 1.0 | 2.6 | 50.0 | 78.2 | 1.4 | |
| 570 | 1.0 | 2.6 | 50.0 | 78.2 | 1.5 | 4.8 |
| 582 | 1.0 | 2.6 | 75.0 | 92.7 | 1.2 | |
| 594 | 1.0 | 2.9 | 75.0 | 94.5 | 1.2 | |
| 606 | 1.0 | 2.9 | 75.0 | 96.3 | 1.2 | 3.8 |
| 618 | 2.0 | 2.9 | 75.0 | 85.5 | 2.6 | |
| 630 | 2.0 | 2.9 | 75.0 | 81.8 | 2.8 | 3.8 |
| 642 | 2.0 | 2.9 | 74.4 | 81.8 | 1.4 | |
| 666 | 0.5 | 2.9 | 75.0 | 100.0 | 1.1 | 4.2 |
| 678 | 0.5 | 2.9 | 74.8 | 98.2 | 1.1 | |
| 690 | 0.5 | 2.9 | 75.0 | 99.0 | 1.1 | |

EXAMPLE 2

This example demonstrates the oxidation of cyanide in the presence of dissolved solids and exemplifies the process where feedstock and oxygen are passed downflow as a single phase. The feed contained 2 weight percent dissolved ammonium sulfate and cyanide at 55 ppm. The feedstock was charged with air at approximately 100 psig to afford an oxygen:cyanide ratio of about 1.5. Since the oxygen concentration was approximately stoichiometric, changing the space velocity afforded minor variations in results. Conversions of cyanide were approximately 10% lower than those observed in the two-phase system where the availability of oxygen was not so limited as in this example. Representative data are reproduced in Table 2.

TABLE 2

Oxidation of Cyanide Using Dissolved Oxygen; High Solids

| TIME (hrs) | WHSV (gm/hr) | pH | TEMP (deg. C.) | % CYANIDE OXIDIZED | SELECTIVITY CYANATE, % | PRODUCT pH |
|---|---|---|---|---|---|---|
| 0 | 0.5 | 4.0 | 75.0 | 98.2 | 1.4 | |
| 12 | 0.5 | 4.0 | 74.7 | 98.2 | 1.1 | |
| 24 | 0.5 | 4.0 | 75.0 | 98.2 | 1.1 | |
| 36 | 0.5 | 4.0 | 74.7 | 98.2 | 1.1 | |
| 48 | 1.0 | 4.0 | 75.0 | 96.4 | 1.2 | |
| 60 | 1.0 | 4.0 | 74.5 | 94.5 | 1.2 | |

TABLE 2-continued

Oxidation of Cyanide Using Dissolved Oxygen; High Solids

| TIME (hrs) | WHSV (gm/hr) | pH | TEMP (deg. C.) | % CYANIDE OXIDIZED | SELECTIVITY CYANATE, % | PRODUCT pH |
|---|---|---|---|---|---|---|
| 72 | 1.0 | 4.0 | 75.0 | 94.5 | 1.2 | |
| 84 | 1.0 | 4.0 | 74.6 | 96.4 | 1.2 | 4.7 |
| 96 | 2.0 | 3.8 | 74.0 | 90.9 | 1.2 | 4.9 |
| 108 | 2.0 | 3.8 | 74.4 | 81.8 | 1.3 | 4.9 |
| 120 | 2.0 | 3.8 | 74.0 | 78.2 | 1.4 | 4.2 |
| 132 | 2.0 | 4.1 | 49.6 | 87.3 | 1.3 | 5.1 |
| 144 | 2.0 | 4.1 | 50.0 | 80.0 | 1.4 | |
| 156 | 2.0 | 4.1 | 49.7 | 74.5 | 1.5 | |
| 168 | 1.0 | 4.1 | 50.0 | 81.8 | 1.4 | 5.3 |
| 186 | 1.0 | 3.3 | 50.0 | 89.1 | 1.3 | 5.7 |
| 198 | 1.0 | 3.3 | 50.0 | 65.4 | 1.7 | |
| 216 | 0.5 | 3.3 | 50.0 | 76.4 | 1.5 | |
| 228 | 0.5 | 3.3 | 50.0 | 74.5 | 1.5 | |
| 240 | 0.5 | 3.3 | 50.0 | 76.4 | 1.5 | |
| 252 | 0.5 | 3.3 | 50.0 | 77.8 | 1.5 | |
| 264 | 0.5 | 3.3 | 33.0 | 72.7 | 1.5 | 4.8 |
| 276 | 0.5 | 3.3 | 25.0 | 81.2 | 1.4 | 4.9 |
| 288 | 0.5 | 3.3 | 23.0 | 96.0 | 1.2 | 5.0 |
| 300 | 0.5 | 3.7 | 23.0 | 98.2 | 1.1 | 5.2 |
| 312 | 1.0 | 3.7 | 23.0 | 90.4 | 1.2 | 5.2 |
| 330 | 1.0 | 3.7 | 23.0 | 74.5 | 1.5 | |
| 342 | 2.0 | 3.7 | 23.0 | 67.3 | 1.7 | |
| 354 | 2.0 | 3.4 | 23.0 | 63.6 | 1.8 | |
| 366 | 2.0 | 3.4 | 23.0 | 67.3 | 1.7 | |
| 378 | 2.0 | 3.4 | 23.0 | 58.2 | 1.9 | |
| 390 | 2.0 | 3.3 | 23.0 | 60.0 | 1.9 | |
| 402 | 2.0 | 3.3 | 23.0 | 60.0 | 1.9 | |
| 414 | 1.0 | 3.5 | 75.0 | 78.2 | 1.4 | |
| 426 | 1.0 | 3.5 | 75.0 | 90.4 | 1.3 | |
| 438 | 1.0 | 3.5 | 100.0 | 85.6 | 1.3 | |
| 450 | 1.0 | 3.5 | 100.0 | 97.6 | 1.2 | |
| 462 | 1.0 | 3.5 | 100.0 | 98.2 | 1.2 | |

EXAMPLE 3

In this example feedstock was passed downflow together with 30 cc per minute of air at a total pressure of 200 psig and at a temperature of 100° C. The data in Table 3 show that 100% conversion can be readily attained at the given weight hourly space velocity and show the potentially beneficial effects of working at somewhat higher temperatures and pressures.

TABLE 3

Oxidation of Cyanide at Higher Temperatures

| TIME (hrs) | WHSV (gm/hr) | pH | TEMP (deg. C.) | % CYANIDE OXIDIZED | SELECTIVITY CYANATE, % |
|---|---|---|---|---|---|
| 0 | 1.0 | 3.5 | 100.0 | 98.2 | 1.2 |
| 12 | 1.0 | 3.0 | 100.0 | 98.2 | 1.1 |
| 24 | 1.0 | 3.0 | 100.0 | 98.2 | 1.1 |
| 36 | 1.0 | 3.0 | 100.0 | 98.2 | 1.2 |

What is claimed is:

1. A method of reducing the water soluble inorganic cyanide concentration in an aqueous stream comprising oxidizing the cyanide under acidic oxidation conditions with an oxidizing agent selected from the group consisting of oxygen, ozone, and hydrogen peroxide in the presence of a catalytically effective amount of a metal chelate, wherein said metal chelate is selected from the group consisting of metal compounds of tetrapyridinoporphyrazine, porphyrin, corrinoid materials, and the phthalocyanines, and wherein said cyanide is oxidized to $CO_2$, $N_2$, and ammonium ion, $NH_4^+$.

2. The method of claim 1 where the metal chelate is water soluble.

3. The method of claim 1 where the metal chelate is water insoluble.

4. The method of claim 1 where the metal chelate is water insoluble and supported on a water-insoluble carrier.

5. The method of claim 4 where the carrier is selected from the group consisting of graphite, charcoal, zeolitic and molecular sieve materials and refractory inorganic oxides.

6. The method of claim 5 where the carrier is charcoal.

7. The method of claim 1 where the metal in the metal chelate is selected from the group of iron, copper, cobalt, and vanadium.

8. The method of claim 7 where the metal chelate is a cobalt chelate.

9. The method of claim 1 where the metal chelate is a sulfonated cobalt phthalocyanine.

10. The method of claim 1 where oxidation conditions include a temperature from about 20° C. up to about 150° C. and a total pressure from about 1 atmosphere up to about 20 atmospheres.

11. The method of claim 1 where the acidic oxidation conditions include a pH from 1 to a pH of about 6.

12. The method of claim 1 where the acidic oxidation conditions include a pH from about 2 to about 5.5.

13. The method of claim 1 where the acidic oxidation conditions include a pH from about 3 up to about 5.

14. The method of claim 1 where the cyanide concentration is reduced by at least 90 percent.

15. The method of claim 14 where the cyanide concentration is reduced by at least 95 percent.

16. The method of claim 15 where the cyanide concentration is reduced by at least 98 percent.

17. A method of reducing the water soluble inorganic cyanide concentration in a cyanide-containing aqueous stream by oxidizing the cyanide under acidic conditions with oxygen comprising flowing at acidic oxidation conditions the cyanide-containing aqueous stream through a bed of a catalytic composite, said composite comprising a metal chelate supported on a carrier, flowing an oxygen-containing gas through said bed, and removing the effluent having a reduced cyanide concentration, wherein said metal chelate is selected from the group consisting of metal compounds of tetrapyridinoporphyrazine, porphyrin, corrinoid materials, and the phthalocyanines, and wherein said cyanide is oxidized to $CO_2$, $N_2$, and ammonium ion, $NH_4^+$.

18. The method of claim 17 where the aqueous stream flows down through the bed.

19. The method of claim 17 where the carrier is selected from the group consisting of graphite, charcoal, zeolitic and molecular sieve materials, and refractory inorganic oxides.

20. The method of claim 19 where the carrier is charcoal.

21. The method of claim 17 where the metal in the metal chelate is selected from the group of iron, copper, cobalt, and vanadium.

22. The method of claim 17 where the metal chelate is a cobalt chelate.

23. The method of claim 17 where the metal chelate is a sulfonated cobalt phthalocyanine.

24. The method of claim 17 where the oxidation conditions include a temperature from about 20° C. up to about 150° C. and a total pressure from about 1 atmosphere up to about 20 atmospheres.

25. The method of claim 17 where the acidic oxidation conditions include a pH from 1 to a pH of about 6.

26. The method of claim 17 where the acidic oxidation conditions include a pH from about 2 to about 5.5.

27. The method of claim 17 where the acidic oxidation conditions include a pH from about 3 up to about 5.

28. The method of claim 17 where the cyanide concentration is reduced by at least 90 percent.

29. The method of claim 28 where the cyanide concentration is reduced by at least 95 percent.

30. The method of claim 29 where the cyanide concentration is reduced by at least 98 percent.

31. The method of claim 17 where the oxygen-containing gas flows countercurrent to the aqueous stream.

32. The method of claim 17 where the oxygen-containing gas flows cocurrent with the aqueous stream.

* * * * *